United States Patent Office 3,095,169
Patented June 25, 1963

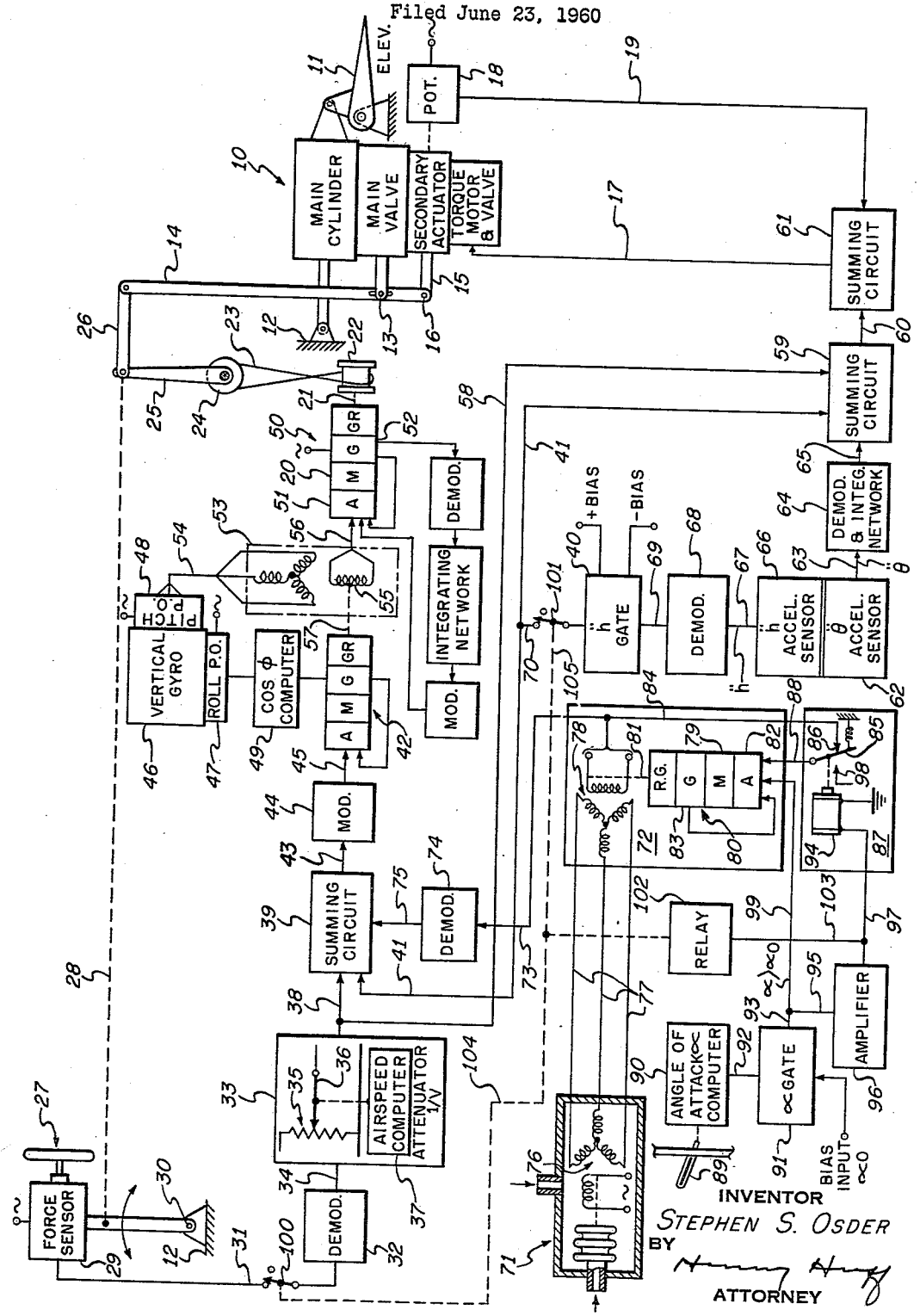

3,095,169
FLIGHT PATH CONTROL SYSTEM
Stephen S. Osder, Phoenix, Ariz., assignor to Sperry Rand Corporation, Great Neck, N.Y., a corporation of Delaware
Filed June 23, 1960, Ser. No. 38,164
13 Claims. (Cl. 244—77)

This invention relates to a system for controlling the path of flight of a dirigible craft such as an aircraft to prevent the occurrence of a stall condition. The improved system limits the angle of attack of the craft to a value that is below a stall condition and controls the related speed factor by commanding a change in attitude of the craft as a pitch down maneuver. As the system computes and exerts the correcting maneuver, the craft is constrained to a flight path where the angle of attack limit is not exceeded.

An object of the invention is to provide a control system of the type described that includes a stick controller where the force of the human pilot at the stick controller is unable to maneuver the craft into a stall condition.

One of the features of the improved system resides in the inclusion therein of a combined craft speed sensor and reference where the provided null of the speed reference corresponds to the actual speed of the craft at a predetermined angle of attack limit.

Another feature is in the provision in the system of a stall sensing means such as an angle of attack sensor and a gate for blocking the output of the angle of attack sensor below a predetermined limit.

A further feature of the system is provided by the utilization of the output of the angle of attack gate to initiate the inclusion in the system of the combined craft speed sensor and reference.

Still another feature of the improved system resides in the provision of a pick-off in the craft speed sensor and combined reference and a driving means for the movable part of the pick-off that is connected to receive the output of the angle of attack gate. This effectively changes the base of the speed reference in accordance with angle of attack values above the limits determined by the gate so that as necessary, the corrective action of the system is increased.

Other features and structural details of the invention will be apparent from the following description when read in connection with the accompanying drawing showing a single schematic view of a preferred embodiment of the improved system.

In the drawing, the improved control system represented includes pitch control means in the form of a servomotor 10 that is operatively connected to the elevators 11 of an aircraft to move it about its pitch axis. The servomotor shown is of the general hydraulic type shown and described in U.S. Patent No. 2,678,177 issued May 11, 1954 to P. J. Chenery et al. for Booster Servo Systems. As in the identified patent, the main cylinder of the servomotor 10 is operatively connected to move with elevator 11 and the internal fixed piston is pivotally connected at its extended rod end to a relatively fixed frame 12 of the craft. The main control valve of the servomotor 10 is provided by a housing that is fixed to the cylinder housing and a slide stem that is pivotally connected at its end 13 to a multiple input connection or differential control link 14. A secondary or damping input to the servomotor 10 shown is provided by a secondary hydraulic actuator of the character of the main servo whose housing is a part of the cylinder and main valve housing and whose piston element extends as a rod 15 that is pivoted to link 14 as indicated at 16. The valve for the secondary actuator is indicated as controlled by an electrically operated torque motor of the character shown in the identified patent whose input is obtained from a lead 17. As shown, a potentiometer 18 provides feedback for the torque motor in accordance with a measure of the displacement between the piston of the secondary actuator from a null condition in relation to the movable common housing of the cylinders of the servomotor and secondary actuator. Lead 19 carries the output of the feedback potentiometer 18.

The primary operating input of the system is transmitted as motion to the link 14 from a booster motor indicated at 20 whose output shaft through suitable reduction gearing drives a shaft 21. The connection between the shaft and link includes a drum 22 driven by the shaft 21, cable 23, a drum 24 driven by drum 22 through the connecting cable 23, and arm 25 extending radially to the axis of drum 24 and a link 26 between the arm 25 and link 14. In the arrangement shown, the booster motor 20 is also connected to position as well as move the pivoted stick and wheel components of a manual control member or controller 27 of the character shown and described in U.S. Patent 2,408,770 issued October 8, 1946 to C. A. Frische et al. As represented, this connection is provided by a general linkage indicated at 28, one end of which is pivoted to arm 25 and the other end of which is pivoted to the stick of the controller 27. The feel of the human pilot in the operation of the system is artificially retained by the direct follow back linkage 28 to the stick. The human pilot's influence in the system is exerted during control stick maneuvers by manual effort exerted on the wheel to strain the stick in the direction of its desired motion about an axis 30 with relation to the frame 12 and the output measure of this effort as determined by a force sensor 29 of the character shown in the noted Frische et al. patent. The sensor 29 is a means providing a command output depending on the manual force exerted on the controller by the human pilot either to resist the motion of the stick or to urge it to move when the booster motor is at rest. Within the flight path limits established by the improved system, the command output of the sensor 29 is effective to operate the booster motor 20 to maneuver the craft about its pitch axis as well as to provide a damping input to the torque motor and valve controlling the operation of the secondary actuator.

As shown, the elevator channel of the improved system connects the force sensor 29 to the booster motor 20 by way of a lead 31 to a suitable demodulator 32 whose output is fed to an attenuator 33 on lead 34. The provided attenuator 33 controls the feel characteristic of the system as a function of airspeed so that the force required at controller 27 to produce a given rate of change of the craft's pitch attitude increases with increasing airspeed. This feel characteristic results in a constant vertical acceleration for a given applied force for a wide range of airspeeds. To prevent the feel characteristics from being "too soft" (excessive pitching rates per given force) at the lower speeds, attenuator 33 is shaped as a non-linear function of airspeed so that the signal on lead 34 is only slightly attenuated for speed reductions below about Mach 0.5. The attenuator used for this purpose includes a potentiometer 35 whose slider 36 is mechanically connected to an airspeed computer 37 so that its output is varied as an inverse function of the speed of the craft. The connecting circuitry shown further includes an output lead 38 from attenuator 33 to a suitable electrical summing circuit 39 that also receives the output of a vertical acceleration gate 40 by way of lead 41 as hereinafter described. The integrating means in the elevator channel of the system shown in the drawing is an amplifier, motor and generator unit 42 of the character shown and described in U.S. Patent No. 2,834,562 to G. F. Jude et al. In the provided arrangement, the output of the summing circuit 39 is fed to the amplifier A of unit 42 to drive the motor M and generator G thereof by way of lead 43, modulator 44 and lead 45.

An attitude reference for the pitch axis control channel of the system is provided by a gyroscopic means such as a gyro vertical indicated at 46 with suitable electrical pick-offs 47 and 48 of the Selsyn-type at the respective roll and pitch axes thereof. To retain the desired artificial feel characteristic in the system during banked maneuvers, the gain in the elevator channel is preferably raised as a function of the roll angle of the craft. This is obtained in the feedback circuit of unit 42 by varying the excitation of the generator G in accordance with the cosine of the angle of bank of the craft from a level condition about its roll or fore and aft axis. The exciting circuit to generator G of unit 42 is accordingly made dependent on the output of the vertical gyro 46 as modified by a cosine computer 49 of the bank angle connected to the roll pick-off 47.

The gyro vertical 46 and pick-off 48 of the system constitute means providing an output with tilt of the craft about its pitch axis from a reference attitude. The booster motor 20 operated by the output of the sensor 29 as well as the pick-off 48 is a component of a second amplifier and generator unit 50 of the type described in the heretofore identified patent to Jude et al. As shown, the respective amplifier and generator components of the unit 50 are indicated at 51 and 52. The unit 50 differs from unit 42 in that a rate feedback to the amplifier 51 is directly obtained from the generator 52 and in that a shaft 21 position feedback is also provided for the amplifier through a second connection to the generator that includes a suitable demodulator, integrating network and modulator. In the arrangement provided, the means for combining the outputs of the force sensor or manual force output means 29 and the pitch reference means 46 includes a data transmission system with a receiver 53 of the Selsyn type, whose stator is electrically connected to the stator of the pick-off 48 by way of leads 54. The wound rotor 55 of the receiver 53 is connected to the input terminal of amplifier 51 through lead 56. The motor of the integrating unit 42 is connected by shafting 57 through suitable reduction gearing to drive the rotor 55 of the receiver 53 and to thereby effectively change the reference established by the vertical gyro 46 for the craft with relation to its attitude about its pitch axis at a rate that is dependent on the force applied at the sensor 29 and its corresponding proportional output. The described operation is effective during control stick steering maneuvers by the human pilot where the craft's vertical acceleration is within predetermined limits and where the output of the receiver 53 results in operation of the booster motor 20 and corresponding operation of the input connection link 26 to the servomotor 10 to control the flight path of the craft. The results of the operation are felt by the human pilot by the simultaneous motion of the stick controller 27 about its axis through means of the arm 25 and the connecting linkage 28. The booster motor 20 of the improved system provides the primary input to the differential link 14 controlling the operation of the servomotor 10. Also through linkage 28, the booster motor 20 operates to move the manually movable member or controller 27 of the system to position it about its axis with relation to the human pilot. In this mode, the operation of the system is damped by movement of the differential link 14 under control of the secondary actuator of the servomotor 10 through energization of the indicated torque motor. The magnitude of the operation of the damping torque motor is dependent on the output of the force sensor 29 which is fed the torque motor by way of lead 58 connected to lead 38, a summing circuit 59, lead 60, a summing circuit 61 and lead 17. A second input to the summing circuit 59 is provided by a sensor providing an output $\ddot{\theta}$ with acceleration of the craft about its pitch axis as indicated at 62. Such acceleration sensing means may be of the character shown and described in U.S. Patent No. 2,487,793, issued November 15, 1949 to O. E. Esval et al.

As shown, the $\ddot{\theta}$ output of the sensor 62 is fed the summing circuit 59 by way of lead 63, demodulator and integrating network 64 and lead 65. The output of the summing circuit 59 is fed to the torque motor by way of lead 60 to the summing circuit 61 where it is combined with the feedback output of potentiometer 18 connected to circuit 61 through lead 19. Lead 17 connects the output of the summing circuit 61 to the torque motor whose valve effects operation of the secondary actuator to move rod 15 and the differential link 14 to damp the system.

The improved system is designed for stable operation within predetermined limits of positive and negative vertical acceleration. Integrated values of such accelerations that exceed the provided limits are utilized in the elevator moving channel to restore the system to stable parameters of operation. The improved system accordingly includes means providing output $\ddot{h}$ acceleration sensor 66 such as shown and described in U.S. Patent No. 2,627,384, issued February 3, 1953, to O. E. Esval. The $\ddot{h}$ gate or vertical acceleration receiver 40 of the system receives the output of the sensor by way of lead 67, demodulator 68 and lead 69. The gate or receiver 40 of the system functions to block the outputs of sensor 66 below a predetermined positive limit and above a predetermined negative limit where gravitational acceleration of one "g" is considered the base acceleration value. As indicated, the outputs $\ddot{h}$ are biased by respective positive and negative voltage inputs to the gate that determine its operating limits. Accordingly, only vertical acceleration outputs $\ddot{h}$ above the provided positive bias voltage and below the provided negative bias voltage are fed to the summing circuit 39 by way of lead 41. Lead 70 connected to lead 41 feeds the output of the $\ddot{h}$ gate to the summing circuit 59 and accordingly the output of the vertical acceleration means beyond the limits of the gate 40 is included in the system as a control for the damping torque motor.

The system is designed so that the effect on the stick force gradient as the vertical acceleration limits provided by gate 40 are exceeded is a sudden stiffening of the force required of the human pilot per vertical acceleration unit characteristic. Within the limits provided by the gate 40, the system establishes a substantially linear relation between the stick force applied and the resulting vertical acceleration so that occurrence of the stiffening effect at the stick is immediately felt by the human pilot. This effect is obtained due to the operation of the pitch channel by the integrated output of the gate 40 in a sense that opposes the output of the force sensor 29 and results in reversal of the direction of rotation of the motor of the integrating unit 42. The rotor 55 of the receiver 53 of the combining means of the channel is then moved at a rate depending on the integrated output of the $\ddot{h}$ gate 40 to reverse the sense of operation of the elevators and restore the system to its normal condition where the vertical acceleration of the craft is within predetermined limits. This limited action due to the inclusion of the output of the gate 40 in the system is felt by the human pilot through the resulting change in operation of the booster motor 20 and its direct effect on the linkage 28.

To prevent the craft from stalling under conditions where its positive acceleration $\ddot{h}$ is below the fixed positive bias limit determined by the gate 40, the improved system includes a speed sensor 71 and speed reference 72 that provides a controlling output that is fed the summing circuit 39 by way of lead 73, demodulator 74 and lead 75. As shown, the sensor 71 is a differential pressure responsive meter of the bellows type having a Selsyn pick-off 76 with a rotor operatively connected to the bellows that is energized from a suitable alternating current electrical source. The sensor 71 is combined with the reference 72 through a data transmission system in which the stator of the speed output pick-off 76 is connected by leads 77 to the stator of a two part pick-off 78 of the Selsyn type constituting one of the components of the speed reference. The relatively movable parts of the pick-off 78 are the respective stator and rotor components of the Selsyn receiver of the data transmission system, one of the parts or components being operatively connected to the sensor 71 and the other of the parts being connected to lead 73. As shown, the rotor or movable part of the pick-off 78 is driven or rotated by a motor 79 in an amplifier, motor and generator unit 80 of the character shown and described in the hereinbefore identified patent to Jude et al. In the arrangement provided, the motor 79 is connected to the rotor of pick-off 78 through suitable reduction gearing by way of shafting 81. The amplifier and generator of the unit 80 are respectively indicated at 82 and 83. Rate feedback for the amplifier 82 is directly obtained from the generator 83.

The provided speed controls prevent the craft from losing speed as a stall condition is approached by the establishment of a base speed that is determined by the speed reference 72 in connection with the sensor 71 at the speed that the craft is operating at when a stall condition is sensed. Under normal conditions of operation, the speed controls included in the system are rendered ineffective by a follow-up arrangement for the sensor 71 that nulls the output of the pick-off 78 to the summing circuit at all speeds of the craft. The system accordingly includes means for normally connecting the motor 79 of unit 80 to the output of the pick-off 78 to obtain this result as well as render the speed reference ineffective. As shown, such means is provided by a normally closed circuit including a lead 84 connected to lead 73, a spring engaged armature 85 and contact 86 of a relay or conditioning means 87 and lead 88 to the amplifier 82. In the arrangement provided, the output of the amplifier drives the motor 79 to move the shaft 81 and rotor of the pick-off 78 to maintain its output at a null regardless of the actual speed of the craft. The included speed reference is accordingly continuously conditioned for operation when a stall condition is sensed.

The stall sensing means provided in the improved system operates to disable the follow-up control means and provide the null for the speed reference 72 at the speed of operation of the craft when it becomes effective. As shown, the stall sensing means includes a suitable angle of attack probe 89 operatively connected to an angle of attack computer 90 whose output $\alpha$ is fed to an $\alpha$ gate 91 by way of lead 92. The gate 91 functions to block the output $\alpha$ of the computer 90 below a predetermined limit as provided by an electrical bias input $\alpha_0$ representing an angle of attack region of impending stall. Accordingly, there is no output from the gate 91 on lead 93 until the angle of attack $\alpha$ exceeds the predetermined bias input $\alpha_0$. This condition is indicated by the values $\alpha > \alpha_0$ in relation to the output lead 93 from the $\alpha$ gate 91. With an output from the angle of attack sensing means or sensor above the predetermined limit of the $\alpha$ gate 91, the coil 94 of the relay or normally ineffective conditioning means 87 is energized by way of lead 95 connected to lead 93, amplifier 96 and lead 97 to ground. This opens the follow-up circuit between the pick-off 78 and motor 79 by the movement of armature 85 from contact 86 to contact 98 and renders the speed reference 72 effective at the speed of the craft at which its angle of attack exceeds the limit determined by the gate 91. The system now operates to nose the craft downwardly by control of the elevators so as to prevent the speed of the craft from going below that established by the operative speed reference 72. In this regard, the output of the speed reference pick-off 78 is fed to the pitch channel of the system to effect operation of the booster motor 20 in the proper sense to obtain the desired change in craft attitude through the differential link 14 and servomotor 10. The operation of the channel in this sense is dependent on the rotation of the rotor of receiver 53 by the controlling speed input to the motor of unit 42 fed thereto by way of lead 73, demodulator 74, lead 75, summing circuit 39 and modulator 44. Unit 42 integrates the speed input thereto and with a decrease in the speed of the craft below the reference speed established by the system, the rotor of the receiver 53 is moved in a direction that commands down elevator to increase the speed of the craft. The rate of rotation of the rotor of the receiver 53 is dependent on the amplitude of the output of the pick-off 78.

In accordance with the invention, the system also operates the moving means or motor 79 for the rotor of the pick-off 78 in response to an output from the angle of attack sensing means above that determined by the $\alpha$ gate 91. As shown, a lead 99 connects amplifier 82 to the output lead 93 of the $\alpha$ gate 91. The output of the gate 91 drives the rotor of pick-off 78 at a rate dependent on its amplitude to change the established speed of the reference to require an increase in craft speed from the system when conditioned for operation by the stall sensing means. This increases the output of the pick-off 78 and hastens the operation of the pitch channel described to restore the system to its normal operating range within the vertical acceleration limits established by the $\ddot{h}$ gate. The angle of attack sensor, speed sensor and speed reference operate in the system to change the attitude of the craft about its pitch axis to prevent the occurrence of a stall condition. This action continues as long as the output of the $\alpha$ gate 91 is above the predetermined limit $\alpha_0$. When the pitch attitude and speed have been corrected so that the angle of attack of the craft is below the limit $\alpha_0$, the conditioning means 87 remains locked so that airspeed control to the newly established safe airspeed reference is retained. Conditioning means 87 is released by interlock circuits which respond to the pilot selecting a new mode of control. It is re-engaged if a stall sequence again develops.

To insure that the only input to the summing circuit 39 of the pitch channel is provided by the speed pick-off 78 during operations in the stall sensing mode, the system includes a normally ineffective cut off for the force sensor 29 in the form of a switch 100 and a normally ineffective cut off for the $\ddot{h}$ gate 40 in the form of a switch 101. The respective switches 100 and 101 are moved to an open position by a suitable relay 102 connected to lead 97 by lead 103 in response to the output of the gate 91 through suitable mechanical connections 104 and 105 between the relay and switches. When there is a null output from the gate 91, the relay 102 operates to return the respective switches 100 and 101 to a closed position.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. In an aircraft pitch attitude controlling system of the character described, an angle of attack sensor providing an output, a gate for blocking the output of the angle of attack sensor below a predetermined limit; an air speed sensor providing an output, a speed reference for the sensor including a pick-off connected to the output of the speed sensor having stator and rotor parts, means for rotating the rotor part of the pick-off, a normally closed circuit connecting the rotating means and pick-off in follow-up relation to null the output of the pick-off and render the reference ineffective, a circuit connecting the rotating means to the angle of attack gate; means responsive to the output of the angle of attack sensor above the predetermined gate limit operable to open the normally closed circuit, and means responsive to the output of the pick-off for changing the attitude of the craft about its pitch axis to prevent the occurrence of a stall condition.

2. In an aircraft pitch attitude controlling system of the character described, an angle of attack sensor providing an output, a gate for blocking the output of the angle of attack sensor below a predetermined limit; an air speed sensor providing an output, a speed reference for the sensor including a pick-off connected to the output of the speed sensor having stator and rotor parts, means for rotating the rotor part of the pick-off, a normally closed circuit connecting the rotating means and pick-off in follow-up relation to null the output of the pick-off and render the reference ineffective, means for opening the circuit to render the reference effective; means for operating said opening means dependent on the output of the angle of attack sensor above the predetermined gate limit, and means responsive to the output of the pick-off for changing the attitude of the craft about its pitch axis to prevent the occurrence of a stall condition.

3. In an aircraft pitch attitude controlling system of the character described; an air speed sensor providing an output, a speed reference including a pick-off having stator and rotor parts, one of which is connected to the speed sensor and the other of which provides an output, means for rotating the rotor part of the pick-off, a normally closed circuit connecting the rotating means in follow-up relation to the pick-off to provide a null output therefrom, means for opening the circuit to provide the null of the speed reference at the speed of operation of the craft when the circuit is opened; a stall sensor providing an output for operating said circuit opening means, and means responsive to the output of the pick-off for changing the attitude of the craft about its pitch axis to prevent occurrence of a stall condition.

4. A system of the character claimed in claim 3, in which said stall sensor includes a sensor operatively connected to the pick-off rotating means having an output depending on the angle of attack of the craft, and a gate for blocking the output of the angle of attack sensor below a predetermined limit.

5. A system of the character claimed in claim 3, in which said stall sensor includes an angle of attack sensor providing an output, a gate for blocking the output of the angle of attack sensor below a predetermined limit, and a circuit connecting the gated output of the angle of attack sensor to the rotating means of the speed reference.

6. A stall prevention system for aircraft including means providing an output depending on the tilt of the craft from a reference attitude about its pitch axis, a sensor providing an output depending on the angle of attack of the craft, a gate for blocking the output of the angle of attack sensor below a predetermined limit; a speed sensor and reference including a pick-off connected to the speed sensor with two relatively movable parts providing an output, means for moving one of the parts of the pick-off, means for normally connecting the moving means and pick-off in follow-up relation to null the output of the pick-off and render the speed reference ineffective, means operatively connecting the pick-off moving means to the angle of attack gate; means responsive to the output of the angle of attack sensor above the predetermined gate limit for disabling said follow-up means to render the speed reference effective at the speed of the craft at which its angle of attack exceeds the limit determined by the gate, means for integrating the output of the pick-off, and means responsive to the outputs of the integrating means and the pitch reference means for changing the attitude of the craft about its pitch axis to prevent the occurrence of a stall condition.

7. In an aircraft pitch attitude controlling system of the character described, a sensor providing an output depending on the angle of attack of the craft, a gate for blocking the output of the angle of attack sensor below a predetermined limit; a speed sensor and reference including a pick-off having stator and rotor parts, means for rotating the rotor part of the pick-off, means for normally connecting the rotating means in follow-up relation to the pick-off to provide a null output from the pick-off and render the speed reference ineffective, means operatively connecting the rotating means to the angle of attack gate; means responsive to the output of the angle of attack sensor above the predetermined gate limit for disabling the follow-up means to render the speed reference effective at the speed of the craft at which its angle of attack exceeds the limit determined by the gate, and means for changing the attitude of the craft about its pitch axis to prevent the occurrence of a stall condition responsive to the output of said pick-off.

8. In an aircraft pitch attitude controlling system of the character described, an angle of attack sensor providing an output, a gate for blocking the output of the angle of attack sensor below a predetermined limit; a speed sensor and reference including a pick-off connected to the speed sensor with two relatively movable parts, means for moving one of the parts of the pick-off, means for normally connecting the moving means and pick-off in follow-up relation to null the output of the pick-off and render the speed reference ineffective, means operatively connecting the pick-off moving means to the angle of attack gates; means responsive to the output of the angle of attack sensor above the predetermined gate limit for disabling the follow-up means to render the speed reference effective at the speed of the craft at which its angle of attack exceeds the limit determined by the gate, and means responsive to the output of the pick-off for changing the attitude of the craft about its pitch axis to prevent the occurrence of a stall condition.

9. In an aircraft pitch attitude controlling system of the character described; a sensor providing an output depending on the speed of the craft, a speed reference having a pick-off with two relatively movable parts, one of which is connected to the output of the speed sensor and the other of which provides an output, means for driving a movable part of the pick-off, means for normally connecting the driving means in follow-up relation to the pick-off to provide a null output from the pick-off and render the speed reference ineffective; stall sensing means for disabling said follow-up means to render the speed reference effective at the speed of the craft at which its angle of attack exceeds a predetermined limit, and means responsive to the output of the pick-off for changing the attitude of the craft about its pitch axis to prevent the occurrence of a stall condition.

10. A system of the character claimed in claim 9, in which said stall sensing means includes a sensor operatively connected to pick-off driving means having an output depending on the angle of attack of the craft, and a gate for blocking the output of the angle of attack sensor below a predetermined limit.

11. A system of the character claimed in claim 9, in which said stall sensing means includes an angle of attack sensor providing an output, a gate for blocking the output of the angle of attack sensor below a predetermined limit, and means for connecting the gated output of the angle of attack sensor to the driving means of the speed reference.

12. A system of the character claimed in claim 9, including a manual operable pitch controller, a sensor providing an output depending on the manual force exerted on the controller, a normally ineffective cut off for the output of the force sensor, and means responsive to the output of said stall sensing means above a predetermined limit for rendering said cut off effective.

13. A system of the character claimed in claim 9, including means providing an output to control the craft about its pitch axis depending on the vertical acceleration of the craft, a normally ineffective cut off for the output of said vertical acceleration control means, and means responsive to the output of said stall sensing means above a predetermined limit for rendering said cut off effective.

No references cited.